(12) United States Patent
Sinha

(10) Patent No.: US 8,072,928 B2
(45) Date of Patent: Dec. 6, 2011

(54) OPTIMAL TIME SLOT ASSIGNMENT FOR NETWORKS

(75) Inventor: Koushik Sinha, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1118 days.

(21) Appl. No.: 11/444,657

(22) Filed: May 31, 2006

(65) Prior Publication Data
US 2007/0280153 A1    Dec. 6, 2007

(51) Int. Cl.
*H04W 4/00* (2009.01)
*H04W 40/00* (2009.01)

(52) U.S. Cl. .................. 370/329; 455/450; 455/446

(58) Field of Classification Search .......... 455/450–453; 370/329, 330
See application file for complete search history.

(56) References Cited

U.S. PATENT DOCUMENTS

| | | | | |
|---|---|---|---|---|
| 5,233,643 | A * | 8/1993 | Naeini et al. | 455/456.1 |
| 5,515,379 | A * | 5/1996 | Crisler et al. | 370/347 |
| 6,359,867 | B1 * | 3/2002 | Ali-Vehmas | 370/331 |
| 2002/0090937 | A1 * | 7/2002 | Laroia et al. | 455/421 |
| 2004/0028018 | A1 * | 2/2004 | Cain | 370/338 |
| 2006/0088048 | A1 * | 4/2006 | Bahl | 370/458 |
| 2007/0165620 | A1 * | 7/2007 | Li et al. | 370/376 |
| 2007/0211686 | A1 * | 9/2007 | Belcea et al. | 370/345 |

OTHER PUBLICATIONS

S. C. Ghosh et al., "Channel Assignment Using Genetic Algorithm Based on Geometric Symmetry", IEEE Transactions on Vehicular Technology, pp. 1-16, Jul. 2003.
S. C. Ghosh et al., "A New Approach to Efficient Channel Assignment for Hexagonal Cellular Networks", Intl. Journal of Foundations of Computer Science © World Scientific Publishing Company, vol. 14, No. 3, pp. 1-25, Jun. 2003.
D. J. Corbett et al., "A Partitioned Power and Location Aware MAC Protocol for Large Ad Hoc Networks", Proc. of European Wireless 2005, Cyprus, 7 pgs., Apr. 2005.
W. Ye et al., "An Energy-Efficient MAC Protocol for Wireless Sensor Networks", 10 pgs., presented at an energy-efficient MAC protocol for wireless sensor networks, 2002.
K. Sinha et al., "Broadcast Algorithms for Mobile Ad hoc Networks based on Depth-first Traversal", Proc. Third Intl. Workshop on Wireless Information Systems (WIS), Apr. 13-14, 2004, Portugal, pp. 170-177.
K. Sinha et al., "Broadcast and Gossiping Algorithms for Mobile Ad hoc Networks based on Breadth-first Traversal", Proc. $6^{th}$ Intl. Workshop on Distributed Computing (IWDC), 12 pgs., Dec. 2004.
Y.-C. Tseng et al., "Fully Power-Aware and Location-Aware Protocols for Wireless Multi-hop Ad Hoc Networks*", Proc. of IEEE Intl. Conference on Computer Communications and Networks (ICCCN), 6 pgs., 2002.

(Continued)

*Primary Examiner* — Lester Kincaid
*Assistant Examiner* — Daniel Lai
(74) *Attorney, Agent, or Firm* — Schiff Hardin LLP

(57) ABSTRACT

Terminals of a network are mapped cells. Time slots are allocated to the cells such that the time slots assigned to a first cell are reused as the time slots assigned to a second cell subject to a k-cell constraint whereby, according to the k-cell constraint, at least k cells separate the first and second cells. Additionally or alternatively, either a terminal j joining a cell i of the network is assigned a time slot in which it reports its presence in the cell i, or time slots are reclaimed within the cell i so that a reclaimed time slot can be allocated to the terminal j.

5 Claims, 12 Drawing Sheets

(A)

(B)

OTHER PUBLICATIONS

S. Basagni et al., "A Mobility-Transparent Deterministic Broadcast Mechanism for Ad Hoc Networks", IEEE/ACM Transactions on Networking, vol. 7, No. 6, pp. 799-807, Dec. 1999.

M. Chrobak et al., "Fast Broadcasting and Gossiping in Radio Networks", Proc. 41st IEEE Symp. Found. of Computer Science (FOCS' 2000), 7 pgs., 2000.

K. Perumal et al., "Neighbor Based TDMA slot assignment algorithm for WSN", Proc. of IEEE Infocom, 3 pgs., 2005.

A. Sen et al., "A new model for scheduling packet radio networks", Wireless Networks 3, pp. 71-82, (1997).

L.F.W. van Hoesel et al., Advantages of a TDMA based, energy-efficient, self-organizing MAC protocol for WSNs, IEEE Vehicular Technology Conference, Italy, pp. 1-5, 2004.

J. Grönkvist, "Comparison Between Scheduling Models for Spatial Reuse TDMA", Proc. of the Affordable Wireless Services and Infrastructure, 5 pgs., Jun. 2004.

Chlamtac et al., "A spatial reuse TDMA/FDMA for mobile multi-hop radio networks," In *Proceedings of IEEE INFOCOM*, 1985, vol. 1, pp. 389-394.

Huson et al., "Broadcast scheduling algorithms for radio networks," In *IEEE MILCOM*, pp. 647-651, 1995.

Zhu et al., "A five-phase reservation protocol (FDRP) for mobile ad hoc networks," *Wireless Networks*, vol. 7, pp. 371-384, Jul. 2001.

S. S. Kulkarni et al. "TDMA services for sensor network," In *Proceedings of the Third International Workshop on Assurance in Distributed Systems and Networks(ADSN)*, Hachioji, Tokyo, Japan, Mar. 2004.

Ramaswami et al., "Distributed scheduling of broadcasts in a radio network," In *NFOCOM*, 1989, pp. 497-504.

S. C. Ghosh et al., "Coalesced CAP: An Improved Technique for Frequency Assignment in Cellular Networks," IEEE Transactions on Vehicular Technology, vol. 55, No. 2, Mar. 2006, pp. 640-653.

J. Zangl et al., "Large ad hoc sensor networks with position estimation," Proc. of 10th Aachen Symposium on Signal Theory, Germany, 2001, 6 pgs.

D. Niculescu et al., "Ad hoc positioning system (APS)," Proc. of IEEE Global Communications Conference (GLOBECOM), 2001, 6 pgs.

W.-H. Liao et al., "GRID: a fully location-aware routing protocol for mobile ad hoc networks," Telecommunication Systems, Kluwer Academic Publishers, vol. 18, pp. 1-26, 2001.

S. Capkun et al., "GPS-free positioning in mobile ad-hoc networks," Proc. of 34th Hawaii Intl. Conf. of System Sciences HICSS, pp. 1-15, Jan. 2001.

B. Chlebus et al., "Deterministic broadcasting in unknown radio networks", Proc. of SODA 2000, pp. 1-10, 2000.

K. Nakano et al., "Randomized initialization protocols for ad-hoc networks", IEEE Trans. on Parallel and Distributed Systems, vol. 11, pp. 749-759, 2000.

K. Nakano et al., "Uniform leader election protocols for radio networks," IEEE Trans. on Parallel and Distributed Systems, vol. 13, No. 5, pp. 516-526, May 2002.

\* cited by examiner (A)  (B)

(A)

(B)

| HELLO | SENDER ID | SLOT VALUE USED |

| MOV | SENDER ID | OLD CELL LEADER ID | SLOT VALUE USED |

US 8,072,928 B2

OPTIMAL TIME SLOT ASSIGNMENT FOR NETWORKS

RELATED APPLICATION

The present application contains subject matter similar to the subject matter of U.S. patent application Ser. No. 11/188,929 filed on Jul. 25, 2005.

TECHNICAL FIELD OF THE INVENTION

The present invention relates to the assignment of a collision-free transmission schedule for a network. The network, for example, may be an ad hoc network, such as a mobile ad hoc network (MANET), operating in a time division multiplexed environment.

BACKGROUND OF THE INVENTION

Ad hoc networks are increasingly being used for many applications. For example, ad hoc networks are used for sensing, detection, and tracking, and are being applied in military, ecological, environmental, and domestic system applications for monitoring and/or control. Ad hoc networks are also being used to automate buildings, universities, factories, etc.

Typically, the terminals of an ad hoc network are randomly and arbitrarily deployed in such a manner that their locations are not necessarily known a priori. The terminals of an ad hoc network may be stationary or mobile. The terminals of an ad hoc network are preferably, although not necessarily, wireless terminals.

Ad hoc networks generally operate over a single channel. Thus, a transmission by one terminal in the network is heard by all other terminals within range of the transmitting terminal. Terminals communicate among themselves in a multihop fashion so that a terminal that wants to transmit to another terminal that is not within its transmission range will transmit to a terminal that is within its transmission and that terminal will transmit to another terminal and so until the transmission arrives at the desired terminal.

Collisions of transmissions occur when two or more terminals within each other's transmission range transmit simultaneously in the same channel. As a result of such collisions, each of the terminals involved in the collision will attempt a retransmission. Every such retransmission causes a delay in message communication, lowers network throughput, and significantly drains the battery life of the terminal.

Many medium access control (MAC) protocols have been developed that attempt to minimize the drain on battery power of the terminals due to the retransmissions resulting from collisions. Time division multiplexing is one approach that has been used to reduce collision between terminals. Time division multiplexing based scheduling algorithms are superior to CSMA-CD based protocols for wireless ad hoc networks and, hence, are preferable wherever it is possible to use time division multiplexing.

Various algorithms are known that attempt to optimize channel allocation in cellular mobile networks. These algorithms attempt to optimally assign frequencies (channels) in cellular networks while assuming different frequency separation constraints. In channel allocation, a two-cell buffering constraint may be used during allocation.

When transmissions in an ad hoc network are based on a time division multiplexing model, existing implementations of time slot assignment attempt to assign a globally unique time slot to each terminal in the network, usually through graph coloring techniques, or by finding an appropriate set of partitions of the set of terminals and then assigning a unique time slot to each of these partitions. The ultimate goal is that no two terminals transmit during the same time slot.

Many of these implementations use more time slots (non-optimal assignment) than the optimal solution. Also, the number of time slots increases rapidly with an increase in the maximum terminal degree of the network graph, although the average terminal degree may be very small. It is also known to use a maximal independent set of terminals to generate a self-organizing time division multiple access schedule.

The pre-existence of a partitioning of the ad hoc network deployment area into a number of disjoint cells has been proposed in several works. The hexagonal cellular structure is assumed to be the conceptually closest approximation to the actually circular circumference of an omni-directional transmission radius while providing a regular cell structure. Therefore, the hexagonal cellular structure is widely used for modeling cellular communication networks.

To form a cellular structure within an ad hoc network, a mapping is used to convert a geographical region to hexagonal grid cells. It is known that time division multiplexing scheduling algorithms for wireless ad hoc networks partition an ad hoc network into hexagonal cellular networks, and that GPS enabled devices or terminals are used in ad hoc networks. Algorithms are also known that execute on terminals and that use the network infrastructure to determine locations of terminals relative to the deployment zone. GPS can provide highly accurate and synchronized global time, besides accurate location information. The knowledge of geographical information by terminals in an ad hoc network is an increasingly popular assumption to provide precise location and timing synchronization information. The current generation of mobile phones are GPS enabled, and there is ongoing research to improve GPS indoors. In the absence of GPS, a relative coordinate system can be used.

The present invention relates to a new approach to determining a collision-free transmission schedule for networks, such as ad hoc networks, using time division multiplexing.

SUMMARY OF THE INVENTION

In accordance with one aspect of the present invention, a method of allocating time slots to a plurality of terminals in a network comprises the following: a) converting the network to a grid having cells; b) computing a time slot demand for each clique of cells in the grid, wherein each clique of cells comprises a number of adjacent cells; c) determining a critical block of cells as a clique of cells having a maximal time slot demand; and, d) assigning time slots to the cells in the critical block and to cells that are adjacent to the critical block such that the time slots assigned to at least certain cells of the critical block are reused as the time slots assigned to the adjacent cells subject to a k-cell constraint whereby, according to the k-cell constraint, at least k cells separate the adjacent cells from the cells whose time slots are being reused for the adjacent cells, wherein $k \geq 2$.

In accordance with another aspect of the present invention, a method is provided to allocate time slots to a terminal j in a cell i of a network. The network is overlaid with a cellular structure including the cell i. The method comprises the following: a) transmitting a first message requiring each terminal in the cell i to reply; b) receiving a second message in response to the first message, wherein the second message is received from the terminal j; c) if the second message is received in an unused time slot of the cell i, allocating the unused time slot to the terminal j and transmitting a third message announcing allocation of the unused time slot to the terminal j; d) if the second message is not received in an unused time slot of the cell i, reclaiming at least one time slot from a terminal that has left the cell i and allocating the reclaimed time slot to the terminal j; and, e) if the second message is not received in an unused time slot of the cell i, and if a time slot cannot be reclaimed as a result of d, computing a new time slot demand for cell i and transmitting a request for a reassignment of time slots based on the new demand for cell i.

In accordance with still another aspect of the present invention, a method of allocating time slots to a plurality of terminals in a network comprises the following: a) mapping the terminals to hexagonal cells; b) forming a clique having at least 7 cells, one of the 7 cells being a center cell of the clique and the other six cells being adjacent to the center cell; c) assigning time slots to the cells in the clique based on a demand w for time slots by the cells so that no time slot is assigned to more than one cell of the clique; and, d) assigning time slots to cells that are adjacent to the clique such that the time slots assigned to the cells of the clique are reused as the time slots assigned to the adjacent cells subject to a 2-cell constraint whereby, according to the 2-cell constraint, at least 2 cells separate the adjacent cells from the cells of the clique whose time slots are being reused for the adjacent cells.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
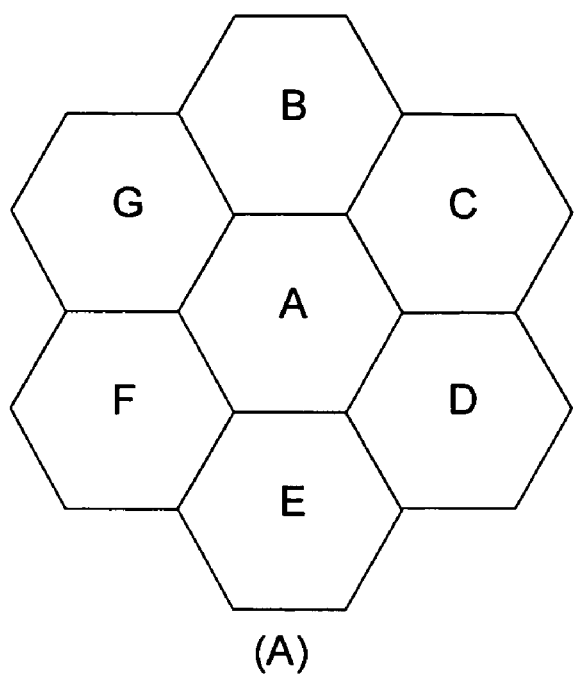
FIG. 1(a) shows a cell a and its six adjacent cells b, c, d, e, f, and g.
FIG. 1(b) shows a corresponding model represented as a hexagonal cellular graph of seven nodes.
Figure 1:
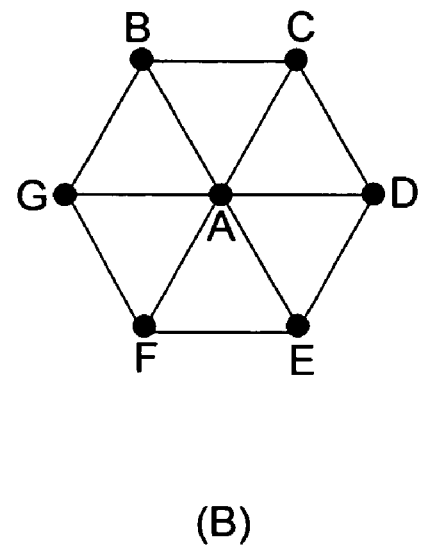

In one aspect of the present invention, a novel strategy is described for assigning time slots to the terminals of a network such as an ad hoc network, based on the location information of the individual terminals. In another aspect of the present invention, a novel strategy is described for assigning time slots to the terminals of a mobile ad hoc network based on the location information of the individual terminals. This strategy improves slot utilization by an elegant technique of re-using the time slots at sufficiently distant terminals, thereby avoiding collisions during transmission.

To implement this strategy, the geographical deployment zone is partitioned into regular hexagonal cells, similar to that used in connection with cellular networks. This hexagonal cellular structure is overlaid onto the ad hoc network. Each hexagonally shaped cell may contain zero or more terminals of the network and each cell is to be assigned a number of time slots as described below.

Using the location information of the terminals, the number of active terminals in each cell and, hence, the actual demand of each cell at that instant of time is determined. As discussed below, a cell i, in general, computes its demand $w_i$ as the sum of the number of terminals within the cell, the number of time slots allocated for control messages, and one or more additional unused time slots. Thus, a cell will have allocated to it a number of time slots that corresponds to the number of terminals in the cell and that are assigned to the terminals so that no time slot is assigned to more than one terminal in the cell, plus a number of time slots in which any terminal in the cell may communicate a control message, plus one or more additional time slots that are not assigned to terminals and that are specifically devoted to control messages. These latter time slots are referred to herein as unused time slots.

The demand computation may be made, for example, by one of the terminals in cell i, and this terminal may be denoted as the cell leader $L_i$. This cell demand information is used to assign time slots to each terminal of the network by a clever reuse of time slots, which exploits the hexagonal symmetry of the imposed cellular structure, and avoids interference among the terminals.

The goal of this strategy is to achieve an optimal collision-free assignment for every terminal of the network in O(n) time, where n is the number of cells in the overlaid hexagonal cellular structure. This problem of finding an optimal time slot assignment schedule for a network may be referred to as the Slot Assignment Problem or SAP. The slot assignment algorithm presented here supersedes existing algorithms with respect to optimality, and requires O (loglog m+mD+n) time to determine an optimal, collision free time slot assignment schedule for the entire network, where n is the number of cells, such as hexagonal cells, in the overlaid cellular graph, and D is the diameter of the ad hoc network. If the network is a mobile ad hoc network, the mobility of the terminals may be taken into account for time slot assignment as well as the new terminals that join the network, the terminals that leave the network, and the handing-off of terminals from one cell to another.

As an example of this strategy, a hexagonal cellular grid structure is overlaid on the network and a collision-free transmission schedule that requires the minimum number of time slots is generated, while satisfying a k cell buffering constraint, where k for example may be 2. This approach has the advantage of low overhead when handling issues relating to terminal mobility and endeavors to ensure that there always exists a substantially collision-free transmission schedule.

Due to absence of collisions in the network and to the use of an optimal number of time slots, network latency is smaller and, hence, network throughput is higher. Furthermore, the absence of collisions results in an increased battery life of the terminals. As a result of these advantages, the present invention is especially useful for sensor networks and for networks where the terminals have constrained battery lives.

In describing the present invention, it is assumed that the terminals of the network possess location information. Also, it is generally agreed that the hexagonal cellular structure is conceptually the closest approximation to the actually circular circumference of an omni-directional transmission radius and that the hexagonal cellular structure provides a regular cell structure. Therefore, the deployment area may be modeled as such a cellular structure. Accordingly, to form a cellular structure within a network, a mapping using any known technique can be implemented to convert the geographical region of the network to hexagonal grid cells. However, cellular structures other than hexagonal cellular structures may instead be used. Moreover, the cell size can be set or adjusted based on factors such as the transmission power or radius of the terminals, the mobility of the terminals, and/or the size of the deployment zone.

Further, the terminals of the network are able to determine their locations relative to the deployment zone. For example, these terminals may either be GPS enabled, or they may be arranged to use the network infrastructure to determine their locations. The terminals are preferably synchronized in time. GPS, for example, can be used to provide highly accurate and synchronized global time, besides accurate location information.

The Slot Assignment Problem (SAP) mentioned above deals with the task of assigning time division multiplexing time slots to the cells while satisfying some time slot separation constraints to avoid transmission collisions and to use as few time slots as possible. A static model of the time slot assignment problem, where the number of time slots required for each cell is known a priori, is first considered.

The available time space is partitioned into equal length time slots and are numbered $0, 1, 2, \ldots$. Time slot assignment, for example, may be characterized by the following components: (1) n distinct cells numbered $0, 1, 2, \ldots, n-1$; (2) a demand vector $W=[w_i]$ such that $0 \leq i \leq n-1$, where $w_i$ represents the number of time slots required for cell i; (3) a time slot separation matrix $C=[c_{ij}]$, where $c_{ij}$ represents the separation requirement between time slots assigned to cells i and j; (4) an assignment matrix$=[\Phi ij]$, where $\Phi ij$ denotes time slot j assigned to cell i such that $0 \leq i < n-1$ and $0 \leq j \leq w_{ij}-1$; and, (5) a set of separation constraints specified by the separation matrix: $|\Phi_{ik}-\Phi_{jl}| \geq c_{ij}$, for all i, j, k, l, $i \neq j$, $k \neq l$.

The goal of the time slot assignment problem is to assign time slots to the cells so as to satisfy the demand vector and separation constraints, such that the required number of time slots is minimal. The case of 2-cell buffering when $s0=s1=s2=1$ may be used in an example implementation.

In a static model of the time slot assignment problem, the number of time slots required for each cell is known a priori. The available time space is partitioned into time slots having for example, equal lengths and are numbered $0, 1, 2, \ldots$. The interference between two assigned time slots is represented in the form of co-slot constraints, due to which the same time slot is not allowed to be assigned to certain pairs of cells simultaneously. For example, a 2-cell buffering time slot assignment problem may be considered for a cellular network such as a hexagonal cellular graph overlaid on a network, in which the same time slot can be assigned to two terminals as long as the terminals are more than 2 cells away from one another.

The notations s0, s1, and s2 are used to denote the minimum time slot separations between assigned time slots in the same cell (s0), in cells at distances of one cell apart (s1), and in cells at distances of two cells apart (s2), respectively. For time slot assignment in a time division multiplexing environment, $s0=s1=s2=1$.

A cellular graph is a graph $G=(V,E)$, where each cell of the grid (e.g., hexagonal grid) is represented by a node V and an edge E exists between two nodes if the corresponding cells are adjacent to each other, i.e., they share a common cell boundary. Cells i and j are spaced a distance k apart if the minimum number of hops it takes to reach cell i from cell j in G is k. All edges E are assumed, although not necessarily so, to be symmetrical.

FIG. 1(a) shows a cell a and its six adjacent cells and FIG. 1(b) shows a corresponding model represented as a hexagonal cellular graph of seven cell nodes. The notation $N_i(u)$ denotes the set of all cells that are at a distance i from cell u.

As a first definition, $G=(V,E)$ is defined as a cellular graph. A sub-graph $G'=(V',E')$ of graph G is a distance-k clique if every pair of nodes in G' is connected in G by a path whose length is at most k and if V' is maximal. V' is said to be maximal if there are no other nodes in G that can be added to the subgraph G'.

As a second definition, a distance-2 clique of seven nodes in a hexagonal cellular network is defined as a complete distance-2 clique. A node that is at a distance 1 from all other nodes in the complete distance-2 clique is termed as the central node or central cell of the complete distance-2 clique, and the remaining nodes in the complete distance-2 clique are termed peripheral nodes or peripheral cells.

In a 2-cell buffering environment, the co-slot interference may extend up to cells at distance 2 apart. In view of this interference, a third definition specifies that a cellular distance-2 clique $G_1=(V_1, E_1)$ is a graph that is generated from a complete distance-2 clique $G_1$ by adding edges to $G_1$ between every pair of nodes that are at a distance 2 in $G_1$.

Figure 3:
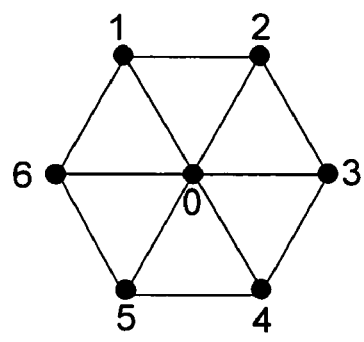
FIGS. 3(a) and 3(b) illustrate a complete distance-2 clique.
Figure 3:
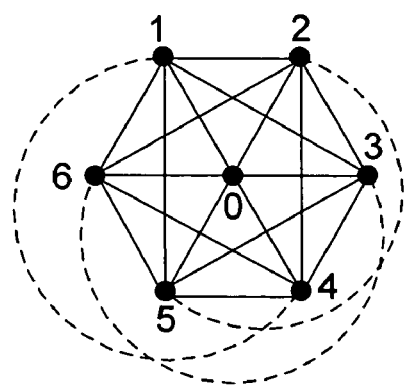

FIGS. 3(a) and 3(b) illustrate a complete distance-2 clique and the corresponding cellular distance-2 clique. Cell 0 is the central node of the graph. The dashed edges in the cellular distance-2 clique of FIG. 3(b) are the edges that join the distance-2 neighbors.

As a fourth definition, if $G_1$ is a cellular distance-2 clique with a node u as the central node, then a cellular distance-2 clique $G_2$ is adjacent to $G_1$ iff (i) u is a peripheral node of $G_2$, and (ii) the central node of $G_2$ is also a peripheral node of $G_1$.

Figure 2:
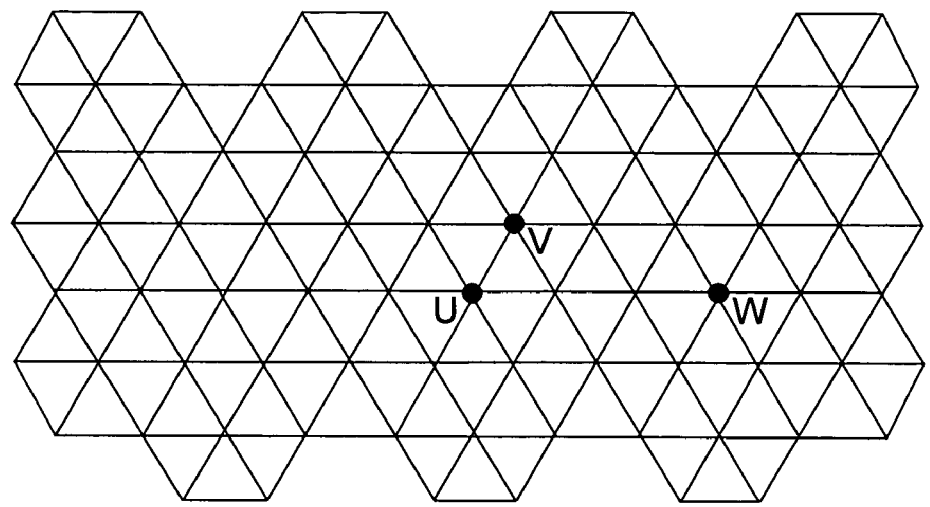
FIG. 2 shows an example expanded hexagonal cellular graph.

This definition is exemplified in FIG. 2 where, for example, node u is the central node in $G_1$ and is also a peripheral node in $G_2$, and node v is the central node in $G_2$ and is also a peripheral node in $G_1$.

The notation $D^{(2)}_7(G)$ is used to denote the sum of the demands of all cells of a cellular distance-2 clique, $G=(V,E)$, where the cardinality of V is $|V| \leq 7$. Then, $D^{(2)}_7(G)=\Sigma w_i$ for all $i \in G$, where $w_i$ is the demand of the cell i for time slots.

As a fifth definition, a 7 node cellular distance-2 clique G or its sub-graph is called a 7-node critical block $CB_7$, which is composed of a maximum of 7 cells, such that the sum of the demands of the cells in $CB_7$ is maximal over all possible cellular distance-2 cliques in the network. The demand of a critical block is denoted $D^{(2)}*_7$. Thus, $D^{(2)}*_7=\max (D^2)_7(G))$ for all G. There may be more than one such cellular distance-2 clique in the network.

The simpler case of homogenous cell demand, where all cells have the same demand, is first considered. Let w represent the homogeneous demand for time slots of all cells in the network. For $w=1$ (i.e., unit demand), the critical block demand $D^{2)}*_7$ would be 7 time slots. Any distance-2 clique can be chosen as the critical block due to structural symmetry. Without loss of generality, the cellular distance-2 clique abcdefg shown in FIG. 4 may be designated as the 7 node critical block, with node g as the central node. In another cellular distance-2 clique gbpqrdc, centered at node c, the node p can be assigned the same time slots as those of node e or f, the node r can be assigned the same time slots as those of node a or f, and the node q can be assigned the time slots as those of node a, e, or f. Thus, the demand of the cellular distance-2 clique gbpqrdc can be satisfied completely by the time slots assigned to the critical block.

Figure 4:
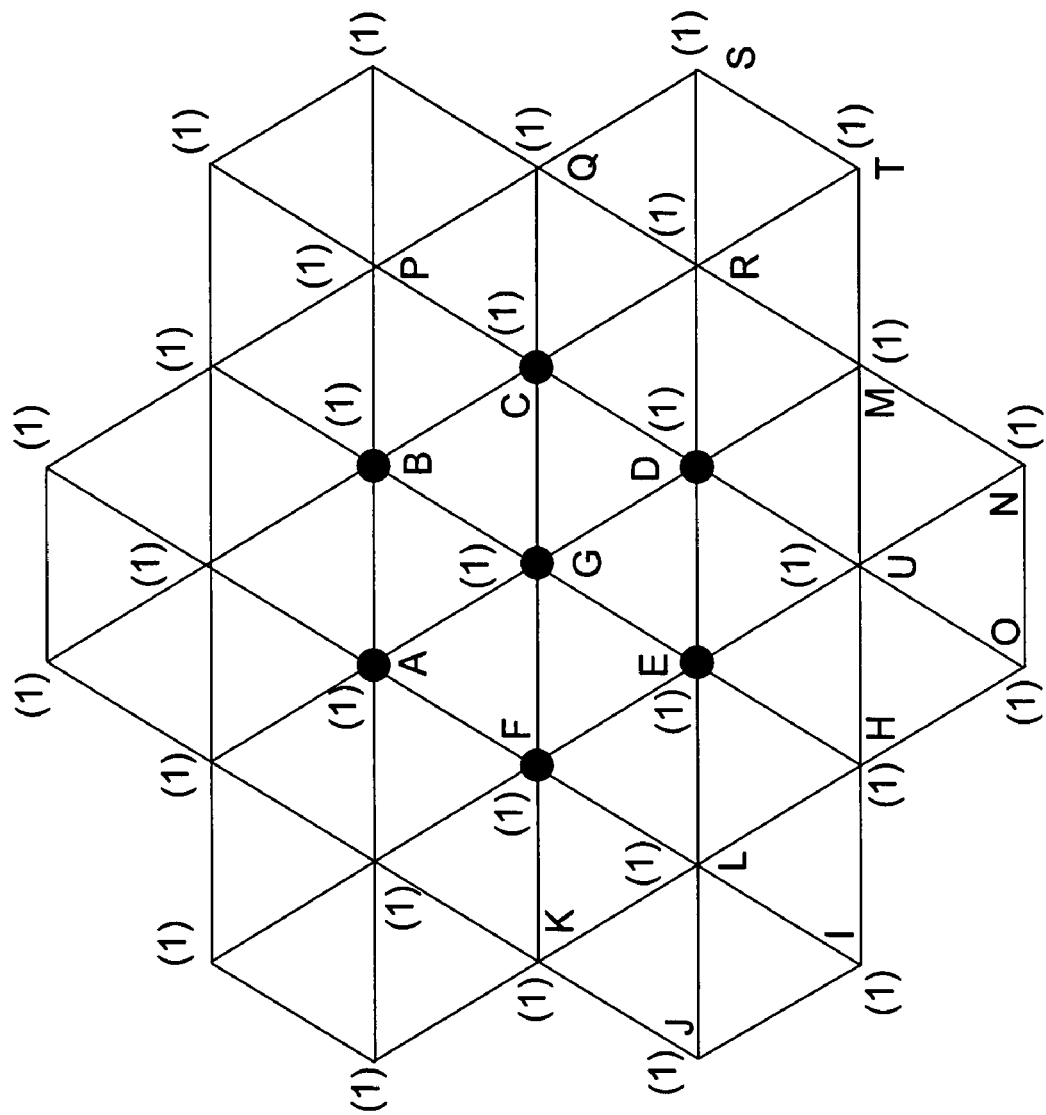
FIG. 4 illustrates a cellular distance-2 clique abcdefg which may be designated as a 7 node critical block, with node g as the central node.
Figure 5:
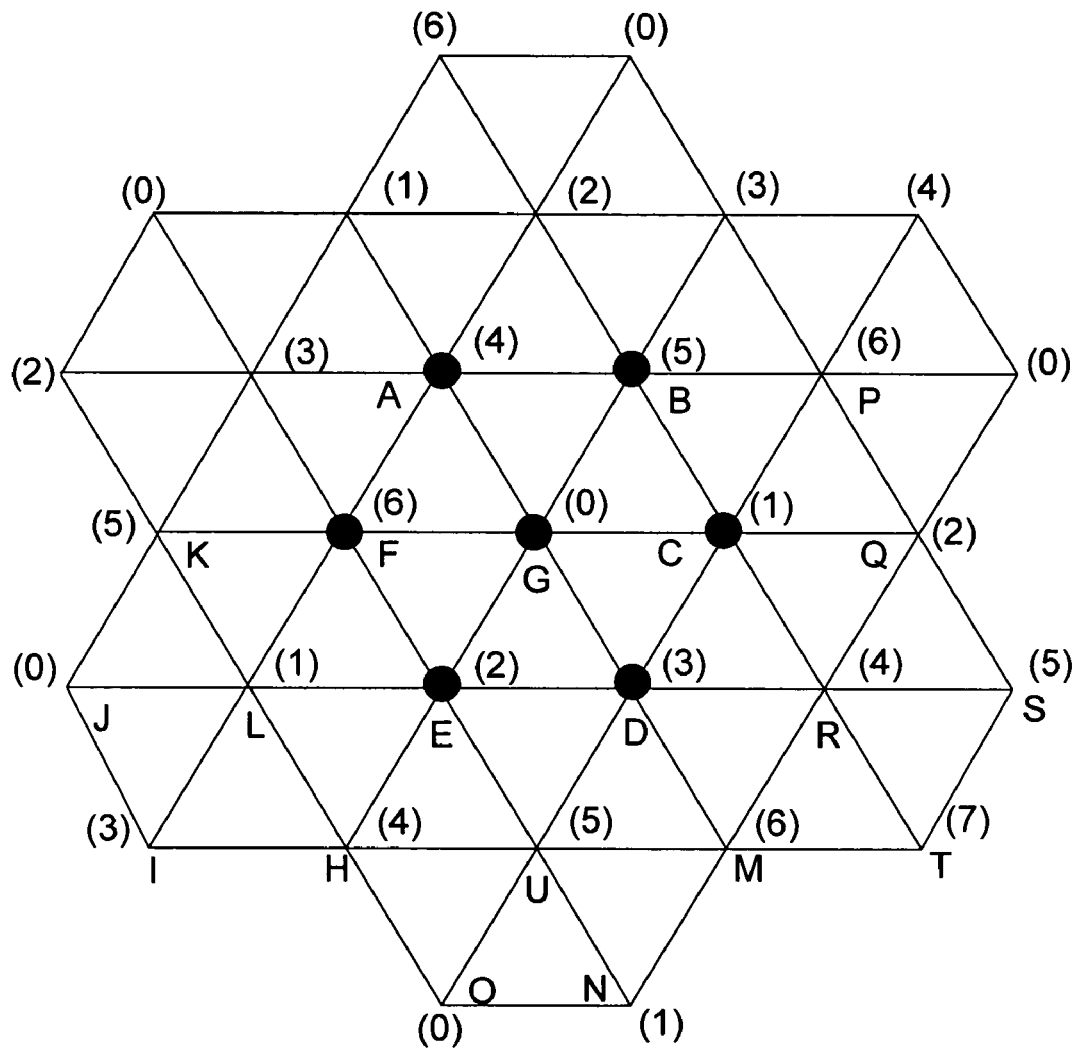
FIG. 5 depicts a possible time slot assignment scheme for the cellular graph of FIG. 4.

FIG. 5 depicts a possible time slot assignment scheme for the cellular graph of FIG. 4. Accordingly, node (cell) p is assigned the same time slot [6] as node f, node r is assigned the same time slot [4] as node a, and node q is assigned the same time slot as node e.

The following results can be stated as a first Lemma. For any given unsatisfied node u (i.e., node u has not yet been assigned a time slot) that is adjacent to one or more satisfied cellular distance-2 cliques (i.e., all nodes in these cliques have been assigned time slots), it is always possible to find a satisfied node v at a distance-3 from u such that the time slot assigned to v is unused within a distance two of u.

In proving this first Lemma, it is recognized that, by definition, a cellular distance-2 clique is a 7 node sub-graph of the cellular graph such that no node in the clique is more than distance-2 of each other. Hence, considering a node u that is adjacent to some node v of this clique, it is easy to see that there must be at least two nodes in the cellular distance-2 clique that are at a distance three from u. Hence, u can be assigned the time slot corresponding to any of these distance-3 nodes without violating the separation constraints.

The following algorithm A can be used to assign time slots in a graph having a homogeneous unit cell demand.
Algorithm A Step 1: Assign time slot number 0 to the center cell of the critical block.

Step 2: Assign time slot number i mod 7, where i≧1, to the $i^{th}$ cell along a particular direction away from the center cell (such as right of the center cell along the horizontal line as shown in FIG. 5). That is, starting from the center cell, time slots 0, 1, 2, . . . , 6 are repeatedly assigned in increasing order to the cells along the particular direction.

Step 3: Assign time slot number i mod 7, i≧1 to the $i^{th}$ cell along an opposite direction to the direction in step 1 (such as left of the center cell along the horizontal line as shown in FIG. 5). That is, time slots 6, 5, . . . , 0 are repeatedly assigned in decreasing order to the cells along the opposite direction.

Step 4: For all rows on one side of the cellular line used in steps 2 and 3 (such as the horizontal rows below the center cell), shift the 0 time slot 3 cells to the left and then repeat steps 2 and 3 to obtain a time slot assignment for each such row.

Step 5: For all rows on the other side of the cellular line used in steps 2 and 3 (such as the horizontal rows above the center cell), shift the 0 time slot 3 cells to the right and then repeat steps 2 and 3 for each such row.

FIG. 5 shows the time slot assignments obtained by using algorithm A. The numbers within the square braces indicate the time slot assigned to a cell. For example, cell (node) g is assigned time slot 0, cell a is assigned time slot 4, cell p is assigned time slot 6, and so on. The cellular distance-2 clique abcdefg was arbitrarily chosen as the critical block, with node g as the central node.

According to a second Lemma, the optimal number of time slots required for a cellular graph with homogeneous demand of w time slots per cell is 7 w time slots.

For all positive and negative integer values (including 0) of m and n, the operation (m,n) mod k is defined as returning the time slots starting from m mod k to n mod k, (including both m and n). The following algorithm B is a homogeneous time slot assignment algorithm that handles w time slots per cell demand, where w can have a value other than unity, and uses only the optimal number of required time slots:
Algorithm B Step 1: Assign time slots (0, w−1) to the central cell of the critical block.

Step 2: Assign time slots (iw, (i+1)w−1) mod 7 w, where i≧1, to the $i^{th}$ cell along a particular direction away from the center cell (such as to right of the center cell along a horizontal line as shown in FIG. 5. That is, the increasing order time slots (0, w−1), (w, 2 w−1), . . . , (6 w, 7 w−1) are repeatedly assigned to the cells along this particular direction.

Step 3: Assign time slots (−iw, −(i−1)w−1) mod 7 w, where i≧1, to the $i^{th}$ cell along an opposite direction to the direction in step 1 (such as left of the center cell along the horizontal line as shown in FIG. 5). That is, the decreasing order time slots (7 w−1, 6 w), (6 w−1, 5 w), . . . , (w−1, 0) are repeatedly assigned to the cells along this opposite direction.

Step 4: For all rows on one side of the cellular line used in steps 2 and 3 (such as the horizontal rows below the center cell), shift the (0, w−1) time slot value 3 cells to the left and then repeat steps 2 and 3 to obtain a time slot assignment for each such row.

Step 5: For all rows on the other side of the cellular line used in steps 2 and 3 (such as the horizontal rows above the center cell), shift the (0, w−1) time slot value 3 cells to the right and then repeat steps 2 and 3 for each such row.

Figure 6:
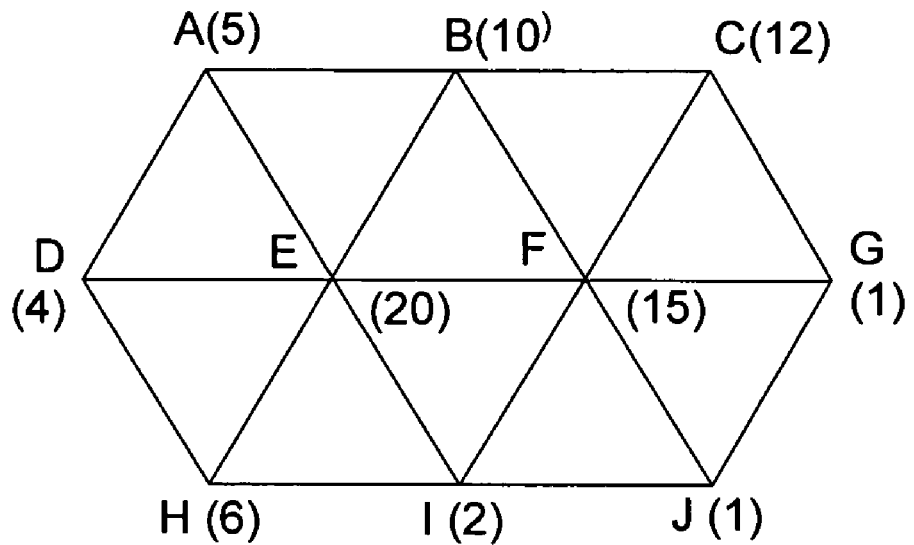
FIG. 6 depicts a cellular graph where the numbers in parentheses beside each cell denotes the demand of the cell.

In the case where cells have different demands (i.e., there exists $w_i$ and $w_j$, i≠j, such that $w_i \neq w_j$), a 7 node critical block is insufficient to determine the optimal number of time slots of the cellular graph, as demonstrated in the following example. In the cellular graph of FIG. 6, the number in parentheses beside each cell (node) denotes the demand of the corresponding cell. The cellular distance-2 clique abfihde has a demand of 62 time slots. The sub-graphs bcgjief and abcef have demands of 61 and 62 time slots, respectively. Thus, we see that there are two candidate critical blocks in the network: either sub-graph abfihde or sub-graph abcef.

The sub-graph abfihde may be arbitrarily chosen as the 7 node critical block. For the distance-2 clique bcgjief adjacent to the critical block, cells g and j can have their demands satisfied from the time slots assigned to the cells a and d. However, the demand of cell c ($w_c$=12) is greater than the time slots assigned to its two distance-3 neighbors, d and h of the 7 node critical block. That is, the demand sum of cells d and h, $w_d+w_h$=(4+6)<$w_c$=12. Hence, it is necessary to assign time slots in addition to those assigned to the critical block in order to satisfy the demand of cell c.

Figure 7:
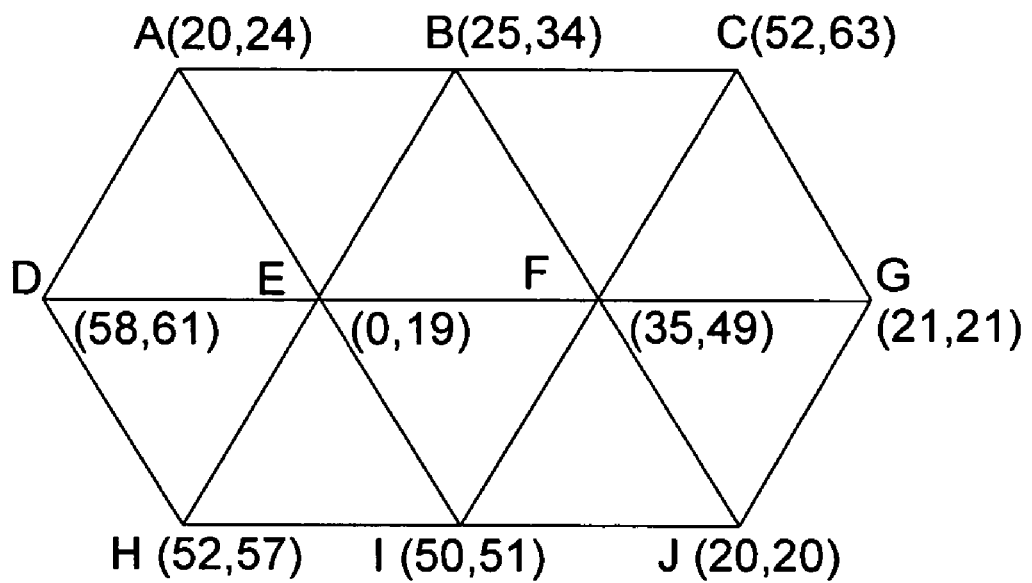
FIG. 7 shows a possible time slot assignment scheme for the graph in FIG. 6.

Accordingly, in the general case of heterogeneous demand, the 7 node critical block will not always give the optimal number of time slots for the cellular network. FIG. 7 shows a possible time slot assignment scheme for the graph in FIG. 6. The 2-tuple beside each cell denotes the time slots assigned to that cell—(m, n) indicates the time slots in the range m to n, both inclusive. Thus, for example, cell a is assigned time slots 20, 21, 22, 23, and 24. Cell g has a demand for only one time slot and is assigned time slot 21.

The 7 node critical block fails to give the optimal number of time slots as it is possible for one of the nodes (cells) adjacent to a node of the critical block, but not a part of it, to have a demand that exceeds the sum of the demands of its distance 3 neighbors in the critical block. From the cellular graph, it can be seen that, for every peripheral node of the critical block, there are three neighbors which are at a distance 3 from some other peripheral node of the critical block. For example, the node f in FIG. 6 with neighbors c, g, and j can be considered.

Node d can contribute to satisfying the demands of all of these three nodes, while node a can only satisfy the demands of nodes j and g, and node h can only satisfy the demands of nodes c and g. Hence, it may be observed that each of these three neighbors a, d, and h is a potential source of excess demand over that of $D^{(2)*}{}_7$, either individually or in combination with the others. This observation suggests that it is necessary to include all of these three nodes in computing the optimal number of time slots.

Using an 8 node or 9 node critical block would also fail to obtain a lower bound on the number of time slots for the same reasons as for a 7 node critical block. So, a 10 node block can be considered. This 10 node block consists of a 7 node distance-2 clique and three other nodes outside of this distance-2 clique such that each of three other nodes is a neighbor of a peripheral node of the distance-2 clique.

A third Lemma results from this consideration as follows: For a cellular network with a heterogeneous demand vector, to find the optimal bandwidth requirement of the network, it is desirable to consider a 10 node critical block, because using a critical block with fewer than 10 nodes would not always be sufficient to compute the minimum time slot requirement of the network.

In order to compute the demand of the 10 node critical block for which the number of time slots will be maximum among all such 10 node blocks, let $C=(V, E)$ be a cellular distance-2 clique, let free_u denote the number of time slots of node $u \in C$ that can be used by a node which is at a distance 3 from u and which is not a part of C, let used_u(j) be the number of time slots assigned to $u \in C$ that are reused by node $j \notin C$ where node j is at a distance 3 from node u, and let $N_3(u)$ denote the set of all distance-3 neighbors of node u. Residual demand $res_j$ of node $j \in N_1(i)$, $i \in C$, $j \notin C$ is defined as $res_j = \max(0, w_j - \Sigma used\_u(j))$. For $i \in C$, the sum of residual demands of $N_1(i)$ which are not in C is termed as the residual sum of neighbors of i and is defined as $Res_i = \Sigma res_j$, $j \in N_1(i)$, $i \in C$, $j \notin C$.

Figure 8:
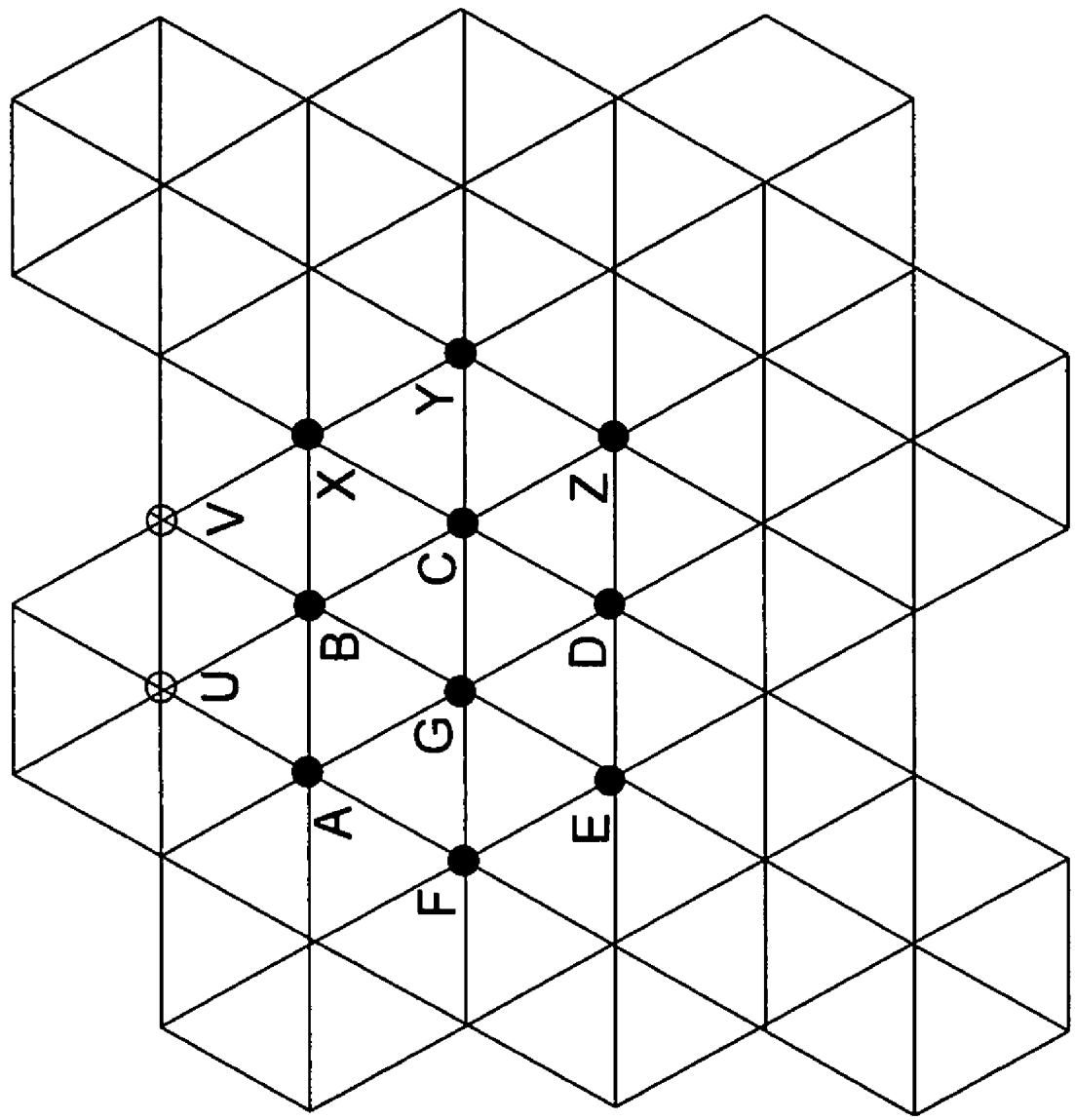
FIG. 8 illustrates an example of a cellular graph useful in demonstrating the procedure for computing a 10 node critical block.

An example involving the cellular graph of FIG. 8 can be used to demonstrate the procedure for computing the 10 node critical block.

Let abcdefg shown in FIG. 8 be a candidate critical block. Without any loss of generality, the three neighbors x, y, and z of node c can be considered. Initially, free_a=$w_a$, free_f=$w_f$, and free_e=$w_e$. The residual demand $Res_c$ may be computed in accordance with the following algorithm C:

Algorithm C

Step 1: Assign time slots to node x using the maximum number of time slots from node e, and the rest, if any, from node f.

used_e(x)=min($w_x$, free_e); free_e=free_e−used_e(x)

used_f(x)=min($w_x$−used_e(x), free_f); free_f=free_f−used_f(x)

$res_x$=max(0, $w_x$−(used_e(x)+used_f(x)))

Step 2: Assign time slots to node z using maximum number of time slots from node a, and the rest, if any, from the node f.

used_a(z)=min($w_z$, free_a); free_a=free_a−used_a(z)

used_f(z)=min($w_z$−used_a(z), free_f); free_f=free_f−used_f(z)

$res_z$=max(0, $w_z$−(used_a(z)+used_f(z)))

Step 3: Assign time slots to y using available number of time slots from nodes e, a and f.

$res_y$=max(0, $w_y$−(free_a+free_e+free_f))

Step 4: Sum the residual demands of x, y and z, i.e., $Res_c = res_x + res_y + res_z$ In algorithm C, the calculations are made in the order that they are stated. For example, in the used_e(x) line of step 1, the calculation of used_e(x) is made before the calculation of free_e.

The maximum residual demand in the cellular distance-2 clique C is denoted $Res_{max}(C)$ and is determined as $Res_{max}(C) = \max(Res_i)$, $i \in C$. With regard to FIG. 8, $D^{(2)}{}_{10}(G)$ represents the demand of the 10 node sub-graph, G=abcdefgxyz, where $D^{(2)}{}_{10}(G) = D^{(2)}7(C) + Res_{max}(C)$. The demand of the 10 node critical block $D^{(2)*}{}_{10}$ is then defined as the demand of a 10 node sub-graph that has the maximal $D^{(2)}{}_{10}(G)$ in the network.

Therefore, a theorem provides that the demand sum $D^{(2)*}{}_{10}$ is the optimal bandwidth requirement of a hexagonal cellular network having a heterogeneous demand vector. In proving this theorem, it is noted that the third lemma discussed above establishes that at least a 10 node critical block should be considered in computing the minimum time slot requirement of a cellular network. The following proves that the demand of a 10 node critical block gives the minimal bandwidth requirement of a hexagonal cellular network with a heterogeneous demand vector.

The nodes adjacent to the critical block have the least number of contributing nodes in the critical block to satisfy their demands. The further away a node is from the critical block, the more the number of contributing nodes in the critical block are required to satisfy its demand. Hence, proving that the demand of any distance-2 clique adjacent to the critical block can be satisfied using only the time slots assigned to the critical block implies that the demand of all other distance-2 cliques in the cellular graph can be satisfied using only the time slots assigned to the 10 node critical block.

Figures 10, 11, 12:
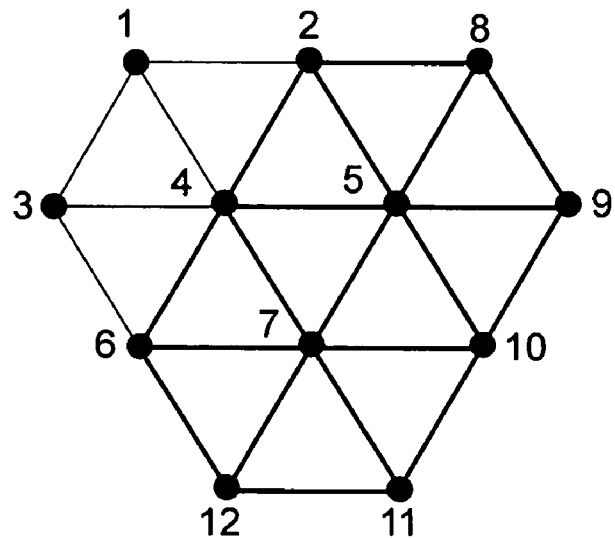
FIG. 10 illustrates an example of a HELLO message which may be used in the present invention.
FIG. 11 illustrates an example of a MOV message which may be used in the present invention.
FIGS. 12-15 depict other examples of a cellular graph.

Let it be supposed that the nodes 1 to 10 in FIG. 12 form the 10 node critical block in a cellular graph, and that the nodes 8, 9 and 10 form the maximum residual set corresponding to the critical block. Also, let it be supposed, without any loss of generality, that nodes 11 and 12 are two nodes adjacent to the critical block whose demands need to be satisfied, that $S_i$ denotes the set of time slots allocated to a node i, and that $N_i$ denotes the set of extra time slots allocated to node i after reusing the time slots from the critical block.

The objective is to prove that the cardinality $|N_{11} \cup N_{12}|$ is always 0. Two scenarios can arise when attempting to assign time slots to nodes 11 and 12 while reusing the time slots assigned to the critical block. The first scenario is that all time slots of cells 1, 3 and 6 are utilized to satisfy the demands of cells 8, 9 and 10, and the second scenario is that only some time slots of cells 1, 3 and 6 are unused after satisfying demands of cells 8, 9 and 10.

The cardinality $|N_{11} \cup N_{12}|=0$ can be proven under all assignment conditions. For this proof, the two scenarios can be considered separately.

For the first scenario, it is assumed that all time slots of nodes 1, 3 and 6 are reused to satisfy the demands of nodes 8, 9 and 10. Thus, $S_8 \subset S_3 \cup S_6 \cup N_8$
$S_9 \subset S_1 \cup S_3 \cup S_6 \cup N_9$
$S_{10} \subset S_1 \cup S_3 \cup N_{10}$
$S_{11} \subset S_1 \cup S_2 \cup S_3 \cup S_8 \cup N_{11}$
$S_{12} \subset S_1 \cup S_2 \cup S_8 \cup S_9 \cup N_{12}$ The worst case scenario, where the minimum number of time, slots from the critical block can be reused for nodes 11 and 12, arises when $S_1$ is fully used in $S_{10}$, $S_3$ is fully used in satisfying $S_9$ and $S_{10}$, and $S_2=\emptyset$, where $\emptyset$ means an empty set.

Figure 13:
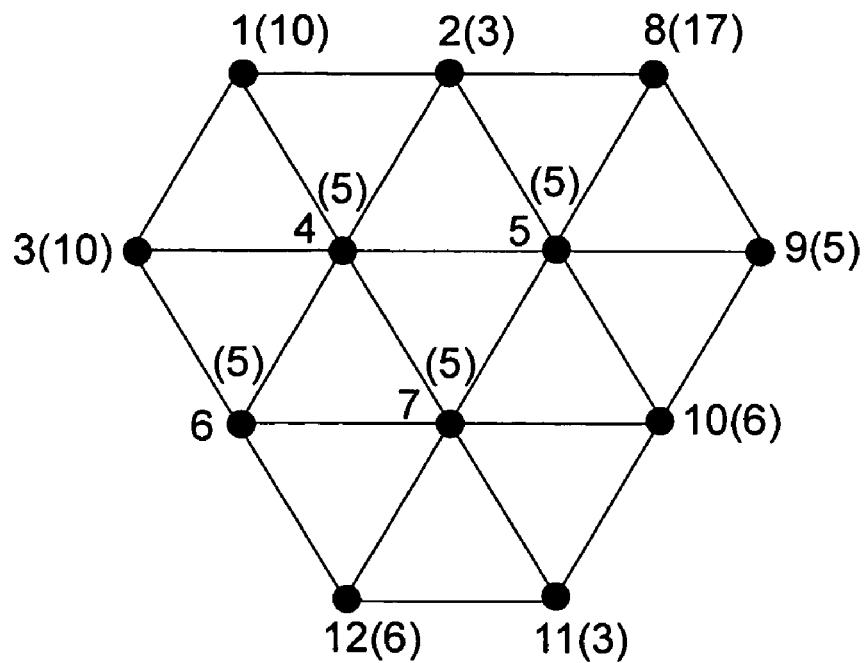

Under such a scenario, the only contributor to $S_{11}$ from node 8 can be the time slots $N_8$. Similarly for $S_{12}$, only $N_8$ and $N_9$ can be reused from nodes 8 and 9. Furthermore, the time slots of $S_1$ and $S_3$ cannot be reused in either $S_{11}$ or $S_{12}$ due to the 2-cell buffering constraint. The modified expressions for $S_{11}$ and $S_{12}$ thus becomes the following:

$S_{11} \subset S_2 \cup N_8 \cup N_{11}$
$S_{12} \subset S_2 \cup N_8 \cup N_9 \cup N_{12}$ Since $S_2=\emptyset$, a conclusion that $N_{11} \cup N_{12} \ne \emptyset$ would imply that the demand sum of the 10 node sub-graph formed by nodes 2, 4, 5, 6, 7, 8, 9, 10, 11, and 12 is greater than that of the 10 node sub-graph formed by the nodes 1 to 7 and nodes 10, 11, and 12. Hence, according to our definition of a 10 node critical block, the 10 node sub-graph formed by the nodes 2, 4, 5, 6, 7, 8, 9, 10, 11, and 12 should have been the 10 node critical block, which is a contradiction to our original assumption. The 10 node sub-graph formed by the thick edges in FIG. 12 depicts this situation, and FIG. 13 shows an example graph for case 1.

Figure 14:
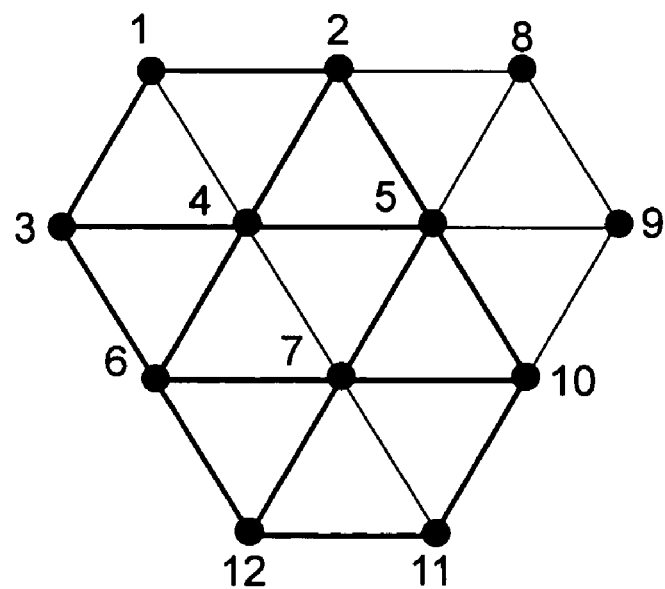
Figure 15:
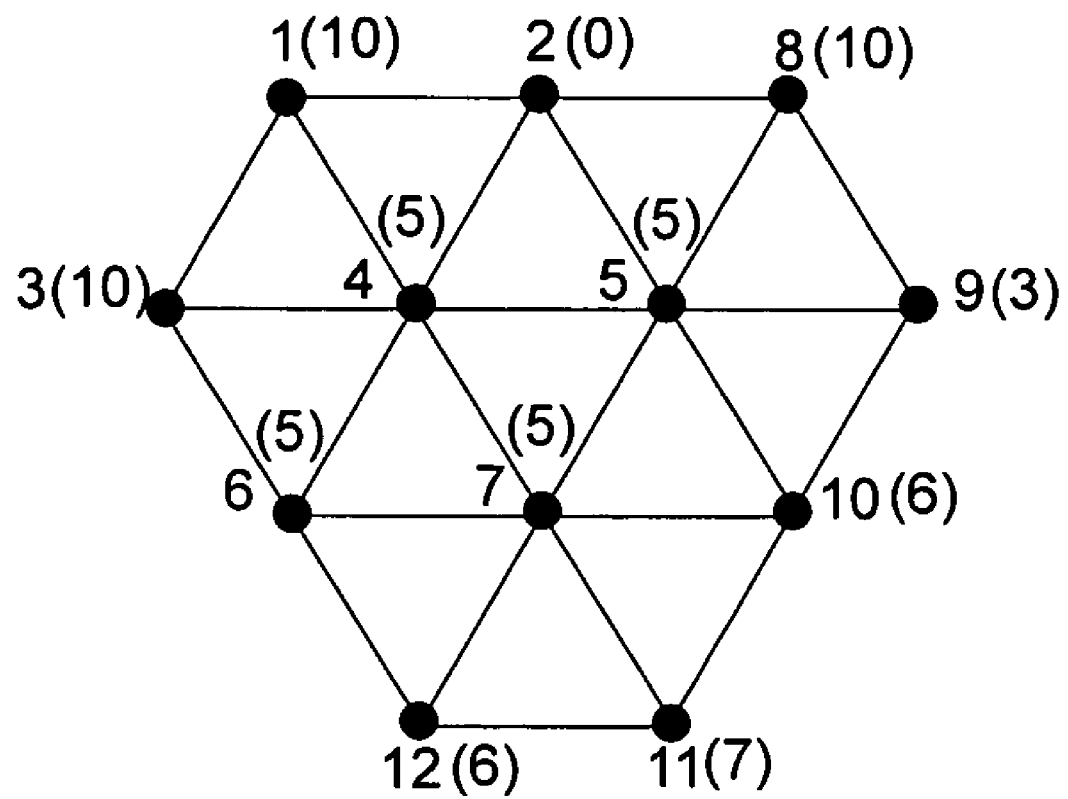

Even for the second scenario, it is possible to satisfy the demands of nodes 11 and 12 by reusing only the time slots allocated to the critical block. By way of proof, it may be assumed that not all time slots of nodes 1, 3, and 6 are utilized to satisfy the demands of nodes 8, 9, and 10. Thus, $S_8 \subset S_3 \cup S_6$
$S_9 \subset S_1 \cup S_3 \cup S_6$
$S_{10} \subset S_1 \cup S_3$
$S_{11} \subset S_1 \cup S_2 \cup S_3 \cup S_8 \cup N_{11}$
$S_{12} \subset S_1 \cup S_2 \cup S_8 \cup S_9 \cup N_{12}$ From FIG. 14, it can be seen that $S_8$ cannot be used for node 12. Also, only the contribution from $S_3$ to $S_8$ can be utilized for $S_{11}$. Similarly, only the time slots of node 1 assigned to $S_9$ can be reused for $S_{12}$. The worst case scenario with the minimum number of reusable time slots from the critical block for nodes 11 and 12 will arise when $S_2=\emptyset$. The expressions for $S_{11}$ and $S_{12}$ would then look like, $S_{11} \subset S_1 \cup S_2 \uparrow S_3 \cup N_{11}$
$S_{12} \subset S_1 \cup S_2 \cup N_{12}$ With $S_2=\emptyset$, $N_{11} \cup N_{12} \ne \emptyset$ implies that the residual demand of nodes 11 and 12 is greater than the residual demand sum of nodes 8 and 9. Hence, according to the definition of a 10 node critical block, nodes 1 to 7 and nodes 10, 11, and 12 should have been the 10 node critical block of the cellular graph, which is a contradiction to our original assumption. FIG. 14 represents this scenario where the sub-graph formed by the thickened edges should have been the actual 10 node critical block, and FIG. 15 shows an example graph for case 2.

Hence, under all conditions, $|N_{11} \cup N_{12}|=0$, implying that any distance-2 clique adjacent to the critical block can be allocated time slots using only the time slots assigned to the critical block. Reasoning along similar lines, it can be shown that for any other distance-2 clique in the cellular graph, it is sufficient to use only the time slots assigned to the 10 node critical block, thus proving that the demand sum of the 10 node critical block is optimal for a hexagonal cellular network having a heterogeneous demand vector.

Figure 9:
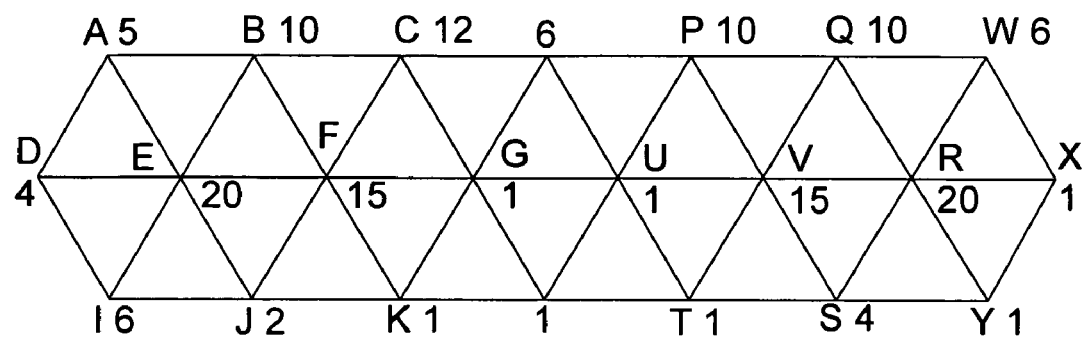
FIG. 9 is useful in illustrating that a cellular distance-2 clique of a 10 node critical block may not be a 7 node critical block.

The cellular distance-2 clique of a 10 node critical block may not be a 7 node critical block, as may be seen from FIG. 9. In FIG. 9, the 7 node critical block demand is 62 time slots. That is, according to the fifth definition described above, a 7 node cellular distance-2 clique G or its sub-graph is denoted a critical block if the sum of the demands of its cells is maximal over all possible cellular distance-2 cliques in the network. The 10 node critical block demand is 65 time slots and is calculated using Algorithm C-described above.

Accordingly, sub-graphs abfjide and abcef both have demands of 62 time slots (corresponding to a 7 node critical block), while the sub-graphs pqrstuvwxy and pqwvrstu both have demands of a 10 node critical block. However, if abfjide (abcef) is chosen as the 7 node critical block, then the demand of the 10 node sub-graph abfjidecgk (abcefdij) would be only 64 time slots.

Algorithm D given below can be used to find an optimal time slot assignment for a cellular network with heterogeneous time slot demand, while satisfying the 2-cell buffering constraint. As explained above, the 2-cell buffering constraint requires there to be two cells between the cells of interest. For example, cells 3 and 9 of interest satisfy the 2-cell constraint because two cells (i.e., cells 4 and 5) are between cells 3 and 9.

Algorithm D

Step 1: For each cell i of the network, construct a cellular distance-2 clique C with i as the central node. Compute the demand sum, $D^{(2)}_7$ of the cells belonging to C.

Step 2: For each peripheral node $j \in C$, compute the residual sum set, $Res_j$.

Step 3: The maximum residual sum set $R_C$ corresponds then to the set of neighbors of a peripheral node $n \in C$ such that $Res_n = Res_{max}(C) = \max(Res_j), j \in C$. Let G denote the 10 node sub-graph corresponding to central node i of C. Then, $G = C \cup R_C$.

Step 4: Compute the demand of G, $D^{(2)}_{10}(G) = D^{(2)}_7 + Res_{max}(C)$

Step 5: Repeat steps 1 to 4 to obtain the demand $D^{(2)}_{10}(G)$ of all 10 node sub-graphs in the network. The maximum of these demands is the 10 node critical block demand. $D^{(2)*}_{10} = \max(D^{(2)}_{10}(G))$, $\forall G$.

Step 6: Now arbitrarily choose one of the 10 node critical blocks producing the critical block demand as the 10 node critical block of the cellular network.

Step 7: Satisfy the demand of the nodes of $CB_{10}$ under the 2-cell buffering constraint.

Step 8: Satisfy the demands of all distance-2 cliques in layer l adjacent to $CB_{10}$. Begin with the clique formed by the nodes of the maximum residual set of $CB_{10}$.

Step 9: Continue the process of assigning time slots to distance-2 cliques in layer 2, layer 3, and so on, in a spiral, layer by layer fashion.

Next is presented a centralized time slot allocation algorithm for assigning time slots as per demand of each cell in a cellular network, while utilizing the minimum number of time slots required for generating a collision-free transmission schedule that satisfies the 2-cell buffering constraint, s0=s1=s2=1. Each terminal has assigned a unique identifier (id) from the set $\{1, 2, 3, \ldots, m\}$, where m is the total number of terminals in the network. It is assumed that each terminal, such as a mobile terminal (MT), knows its positional coordinates.

For each cell, a terminal is also elected or selected as the cell leader in order to handle terminals joining or leaving the cell or network. In the case of a mobile network, the cell leader will also handle the mobility of terminals. The duties of the cell leader include computation of the time slot demand of the cell, control of admission of new terminals into or old terminals leaving the network, handling of hand-off situations in the case of a mobile terminal network, and communicating the demand of the cell to the network leader and requesting a re-computation of the allocated time slots whenever necessary.

In order to handle mobility of terminals in a mobile network, each cell keeps one or more time slots for transmitting control messages and one or more unused time slots for handling new terminals joining the network and hand-off scenarios. In general, a cell i computes its demand $w_i$ as the sum of the number of terminals in the cell, the number of time slots allocated for control messages, and the number of unused time slots. For example, the number of unused time slots may be some fraction f of the number of terminals currently in the cell. If $m_i$ is the number of terminals currently in cell i and c time slots are used for control purpose, then the demand $w_i$ of cell i is $w_i = m_i + c + \max(1, \lceil fm_i \rceil)$, $0 \leq f \leq 1$.

The centralized time slot allocation algorithm, Algorithm E, is given as follows:

Algorithm E

Step 1: Elect or select a terminal as the network leader through some known leader election or selection protocol and refer to this terminal as network leader L.

Step 2: The network leader L broadcasts a mapping to convert the geographical region into a hexagonal grid structure to all the terminals of the network. Each terminal i, on receiving this message, appends to it its own location coordinates and transmits the appended message in the $i^{th}$ time slot to avoid collision during this step.

Step 3: For each cell i, a cell leader $L_i$ is elected or selected from the terminals residing in cell i based on some metric such as remaining battery power, load, location, etc.

Step 4: The demand of each cell i, $w_i$, is calculated by each cell leader $L_i$ and is communicated to the network leader L. The network leader L produces an optimal, collision-free transmission schedule by appropriately executing ALGORITHM A, ALGORITHM B, ALGORITHM C, and/or ALGORITHM D.

Step 5: The network leader L broadcasts the time slot assignment schedule of the network to each cell leader. The time slot assignment schedule details the time slots assigned to each cell i, which had demanded $w_i$ time slots. Once the cell leader $L_i$ of cell i receives the information about the time slots assigned to it from the network leader L, it generates a transmission schedule for the terminals in the cell i and does a periodic local broadcast of this schedule within the cell i.

The lowest numbered time slots assigned to a cell are marked as the control time slots. Alternatively, any other suitable assignment of control time slots may be used. Also, the highest numbered control time slot is assumed to be unused so that, in the event that there are no unused time slots currently in the cell, a new terminal in the cell can use this time slot to communicate with the cell leader. Alternatively, this unused control time slot can be any of the others of the control time slots.

The following describes how various situations, such as new terminals joining the network, old terminals leaving the network, and handing-off are handled.

New Terminal Joining the Network—In each cell, the cell leader $L_i$ periodically locally transmits a cell status message $M_s$ within the cell. When a new terminal j joins the network in some cell i, it first waits to hear the $M_s$ message. Subsequently, it executes the following algorithm to join the network in cell i:

Algorithm F

Step 1: If there exists at least one unused time slot in cell i, then terminal j randomly selects an unused time slot k of cell i and sends a HELLO message to the cell leader $L_i$. In the event that there are no free time slots in cell i that can be used by terminal j, terminal j transmits a HELLO message in the unused (e.g., highest numbered control time slot), which according to the protocol is always unused. The HELLO message contains the following pieces of information and its structure is shown in FIG. 10: (i) Message Type is set to HELLO; (ii) ID of the new terminal joining the cell; and (iii) the time slot used by the new terminal to transmit the HELLO message.

Step 2: The HELLO message, if heard by its neighbors, is retransmitted by each neighbor of terminal j in cell i.

Step 3: If the cell leader $L_i$ hears a HELLO message from a new terminal j in an unused time slot k of cell i, the cell leader $L_i$ execute steps 3.1 and 3.2; otherwise, goto step 4.

Step 3.1: The cell leader $L_i$ marks time slot k to be allocated to terminal j.

Step 3.2: The cell leader $L_i$ initiates a local cell broadcast of updated cell status message $M_s$, reflecting the time slot allocated to terminal j. The cell status message is also an ACK from the cell leader $L_i$ to terminal j that it has been assigned time slot k.

Step 4: If the HELLO message from terminal j was transmitted in a control time slot then, Step 4.1: The cell leader $L_i$ initiates a garbage collection routine to reclaim time slots that were assigned to terminals that have left the cell i. The garbage collection process works as follows:

Step 4.1.1: The cell leader $L_i$ transmits a local cell broadcast requesting each terminal in cell i to send an ACK to the cell leader $L_i$. The time slots of terminals not sending an ACK are reclaimed by the cell leader $L_i$.

Step 4.1.2: The ACKs from neighbors are piggybacked on the ACK transmission of each terminal.

Step 4.2: If even after garbage collection, the cell leader $L_i$ fails to find a sufficient number of unused time slots to accommodate all the new terminals in cell i then, Step 4.2.1: The cell leader $L_i$ computes the new demand of cell i, $w_i$, taking the new terminals in i into account.

Step 4.2.2: The cell leader $L_i$ sends a request to the network leader L to do a reassignment of time slots using the new $w_i$.

Step 5: If terminal j fails to hear an ACK message from the cell leader $L_i$ within some timeout interval T, it assumes that it was not allocated any time slot by $L_i$. This can occur under the following conditions:

Case 1: The cell leader $L_i$ was unable to allocate a time slot to terminal j

Case 2: Some other new terminal(s) tried to transmit in the same time slot as j and hence the transmission was garbled due to collision.

On timeout, terminal j uses a back-off algorithm (such as an exponential back-off algorithm) and tries to transmit again. It continues this until it receives an ACK from the cell leader $L_i$.

Terminal Leaving Cell or Network—If a terminal u other than the cell leader $L_i$ or the network leader L leaves its current cell, then no immediate update action is taken. The time slot assigned to terminal u may be reclaimed by the cell leader $L_i$ during a garbage collection in the event that the cell leader $L_i$ fails to find a sufficient number of unused time slots in the cell to satisfy a new incoming terminal in the cell. If a cell leader $L_i$ leaves the network or the cell, then no transmission will be heard by the terminals of the corresponding cell in the control time slots. When such a situation occurs, a new cell leader is elected from the remaining terminals. If the network leader L has-left the network, then the existing cell leaders participate to elect a new network leader.

Hand-off of Terminals—A hand-off is required when a terminal u moves from one cell i to another cell j. The process of handing-off is treated in the same way as if a new terminal were joining cell j, with an additional message sent from the cell leader $L_j$ to the cell leader $L_i$ indicating the new cell in which terminal u can be found. For terminal u, when it moves from a cell i into a cell j, it waits to hear the $M_s$ message from the cell leader $L_j$ of cell j. The terminal u then sends a MOV message to the cell leader $L_j$ instead of a HELLO message. The structure of a MOV message is shown in FIG. 11. The procedure by which a MOV message is sent and the actions taken by the cell leader $L_j$ is the same as when a new terminal joins a cell, with an additional control message sent by the cell leader $L_j$ to the cell leader $L_i$, informing the cell leader $L_i$ of the new cell in which terminal u is currently residing.

Figure 16:
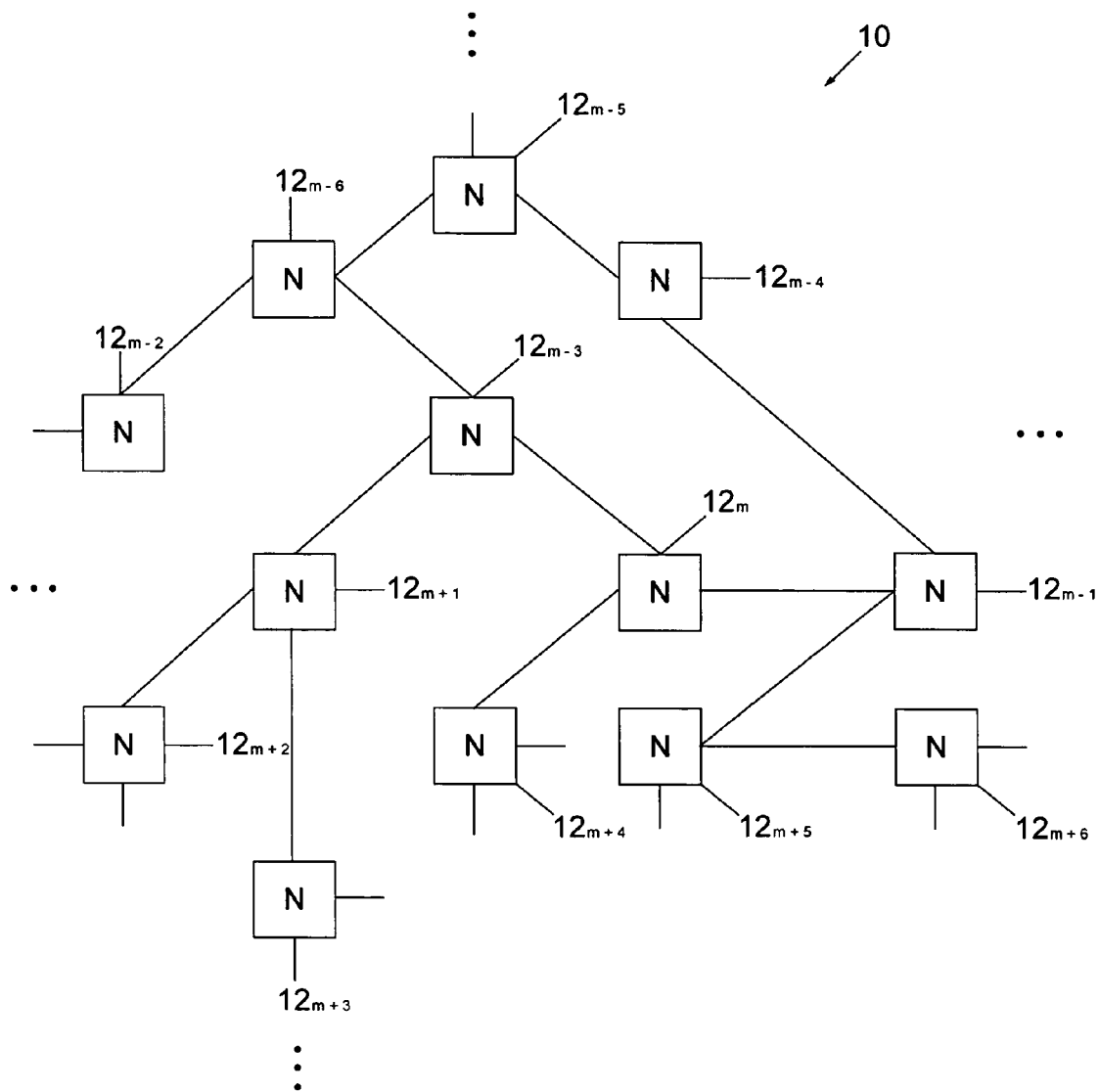
FIG. 16 illustrates a network comprising a plurality of nodes over which a cellular graph may be laid; and, FIG. 17 illustrates a representative one of the nodes of the network shown in FIG. 1.

FIG. 16 shows a network 10 comprising terminals $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$. The network 10, for example, may be a sensor network such as a wireless sensor network. Accordingly, the links between the terminals $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ may be wireless links such as infrared links, ultrasonic links, RF links, or any other type of wireless link. Alternatively, these links may be provided by electrical wires, optical fiber cables, or other physical connections between the terminals.

As shown in FIG. 16, each of the terminals may be in direct communication with one or more other terminals and may be in indirect communication with one or more of the remaining terminals. For example, the terminal $12_{m-3}$ is in direct communication with the terminals $12_{m-6}$, $12_m$, and $12_{m+1}$, and is in indirect communication with other terminals such as the terminals $12_{m-2}$ and $12_{m-5}$ through terminal $12_{m-6}$. The terminals $12_{m-6}$, $12_m$, and $12_{m+1}$ are considered to be one-hop neighbor terminals of the terminal $12_{m-3}$ because they are within the transmission range of the terminal $12_{m-3}$.

Figure 17:
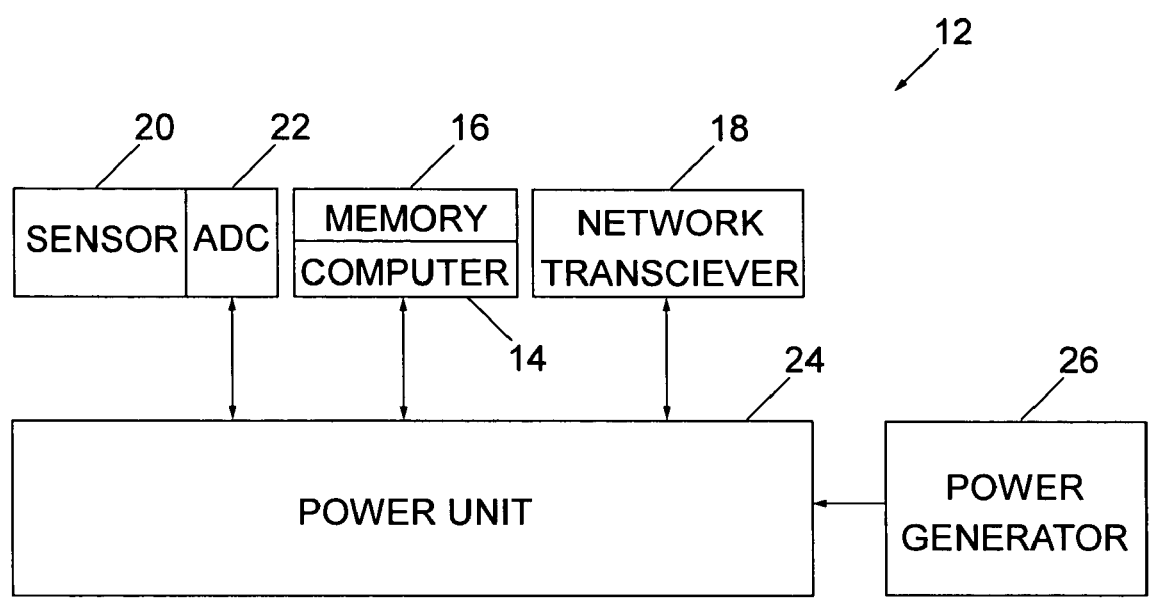

As shown in FIG. 17, the terminal 12, which, for example, may be representative of each of the terminals shown in FIG. 16, includes a computer 14, a memory 16, and a network transceiver 18. Alternatively, the computer 14 may be a processor or a computer/data processor combination. Accordingly, the word "computer" is used generically herein.

The memory 16 stores the algorithms described above whose execution by the computer 14 implements the time slot assignment described herein. Thus, each terminal in the network has the capability of performing the functions of the network leader L and the cell leader $L_i$ within its cell. Accordingly, each terminal in the network is capable of executing ALGORITHM A through ALGORITHM F as described above.

The network transceiver 18 permits communication between the terminal 12 and the other terminals in the network 10. The network transceiver 18 supports communication with other terminals of the network 10 such as the one hop neighbor terminals of the terminal 12. The communications transmitted or received by the network transceiver 18 can be wireless communications over wireless links as discussed above. Alternatively, the communications transmitted or received by the network transceiver 18 can be communications over physical or other links as also discussed above.

In the case where the terminal 12 is a sensor terminal, the terminal 12 also includes a sensor 20 and an A/D converter 22 that coverts the analog signal from the sensor 20 to a digital signal for processing by the computer 14. The sensor 20 can be any sort of sensor suitable for the particular application of the network 10. A power unit 24 is supplied with power from a power generator 26, and also provides power to and supports communication between the computer 14, the memory 16, the network transceiver 18, and the A/D converter 22. The power generator 26 can be a battery, a power supply, or any other type device capable of providing appropriate power for the terminal 12.

In the case where the network 10 is a wireless sensing network, the terminal 12 has a communication radius and a sensing radius. The communication radius defines a distance over which the terminal 12 is capable of effectively communicating with its one-hop neighbor terminals. The sensing radius defines a distance over which the sensor 20 of the terminal 12 is capable of effectively sensing a condition. The communication radius of the terminal 12 should be at least as great as the sensing radius of the sensor 20 of the terminal 12. Each of the other terminals of the network should be similarly constructed. Moreover, each terminal 12 of the network 10 should have at least one other terminal 12 within its communication radius. These relationships ensure that each of the terminals 12 of the network 10 will be able communicate any condition that it senses to at least one neighbor terminal in the network 10. If desired, the communication radius of the terminal 12 can be twice the sensing radius of the sensor 20 of the terminal 12.

Certain modifications of the present invention have been discussed above. Other modifications of the present invention will occur to those practicing in the art of the present invention. For example, as described above, each terminal 12 in the network 10 has the capability of performing the functions of the network leader L and the cell leader $L_i$ within its cell, such that each terminal 12 in the network is capable of executing ALGORITHM A through ALGORITHM F as described above. Alternatively, the terminals 12 in the network 10 may have a pre-designated role such that one terminal is pre-designated as the network leader L and other terminals are pre-designated as cell leaders $L_i$. If so, then not every terminal needs to provided with all of the ALGORITHM A through ALGORITHM F.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of allocating time slots to a terminal j in a cell i of a network, wherein the network is overlaid with a cellular structure including the cell i, the method comprising:
    a) receiving a first message from the terminal j;
    b) in the event the first message is received in an unused time slot of the cell i, allocating the unused time slot to the terminal j and transmitting a second message announcing allocation of the unused time slot to the terminal j;
    c) in the event the first message is not received in an unused time slot of the cell i, reclaiming at least one time slot from a terminal that has left the cell i and allocating the reclaimed time slot to the terminal j; and,
    d) in the event the first message is not received in an unused time slot of the cell i, and in the event a time slot cannot be reclaimed as a result of c, computing a new time slot demand for cell i and transmitting a request for a reassignment of time slots based on the new demand for cell i.

2. The method of claim 1 wherein the terminal j has an $ID_j$, wherein $ID_j$ uniquely identifies terminal j, and wherein the first message includes $ID_j$ and the time slot in which the first message is received from the terminal j.

3. The method of claim 1 wherein c comprises:
    transmitting a third message requesting each terminal in the cell i to reply; and,
    allocating a time slot of a terminal for which no reply to the third message is received to the terminal j.

4. The method of claim 1 wherein the terminal j is a newly active terminal that has not been active in any other cell.

5. The method of claim 1 wherein the terminal j has entered cell i from another cell, and wherein the method further comprises transmitting a third message notifying at least one other cell that the terminal j is now part of the cell i.

* * * * *